US006947506B2

(12) United States Patent
Mills

(10) Patent No.: US 6,947,506 B2
(45) Date of Patent: Sep. 20, 2005

(54) METHOD AND APPARATUS FOR IMPROVED TURBO MULTIUSER DETECTOR

(75) Inventor: Diane G. Mills, Wilmington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 347 days.

(21) Appl. No.: 10/120,955

(22) Filed: Apr. 11, 2002

(65) Prior Publication Data

US 2003/0193966 A1 Oct. 16, 2003

(51) Int. Cl.[7] .......................... H03D 1/04; H03D 1/06; H03K 5/01; H03K 6/04; H04B 1/10

(52) U.S. Cl. ....................... 375/346; 375/341; 375/285; 375/262

(58) Field of Search ................................ 375/260, 262, 375/265, 341, 340, 346, 285, 348, 350; 714/786, 794, 795, 796

(56) References Cited

U.S. PATENT DOCUMENTS

| | | | | | |
|---|---|---|---|---|---|
| 5,790,606 | A | | 8/1998 | Dent | |
| 5,982,813 | A | | 11/1999 | Dutta et al. | |
| 6,122,269 | A | | 9/2000 | Wales | |
| 6,182,261 | B1 | * | 1/2001 | Haller et al. | 714/758 |
| 6,198,775 | B1 | | 3/2001 | Khayrallah et al. | |
| 6,219,341 | B1 | | 4/2001 | Varanasi | |
| 6,298,461 | B1 | * | 10/2001 | Tong et al. | 714/755 |
| 6,397,367 | B1 | * | 5/2002 | Park et al. | 714/786 |
| 6,570,919 | B1 | * | 5/2003 | Lee | 375/233 |
| 2003/0193966 | A1 | | 10/2003 | Mills | |
| 2003/0204808 | A1 | | 10/2003 | Mills | |
| 2004/0017863 | A1 | | 1/2004 | Learned | |

OTHER PUBLICATIONS

PCT International Search Report dated May 25, 2004 of International Application No. PCT/US03/32335 filed Oct. 9, 2003.

* cited by examiner

*Primary Examiner*—Jean B. Corrielus
(74) *Attorney, Agent, or Firm*—Joseph Funk; Daniel J. Long

(57) ABSTRACT

A multi-user turbo decoder combining multi-user detection and forward error correction decoding is disclosed that utilizes iterative decoding of received, interfering signals, and the construction of a decoding tree of the decoder is changed for each iteration of the decoding based on the previous conditional probability estimates of the value of the data bits of each signal making up the received, interfering signals. Before each iteration of multi-user decoding, a probability estimate is calculated that the value of the bit in a signal has a certain value for all of the data bits. Using the probability estimate a new decoding tree is constructed before each iteration of decoding such that the signal bit having the most reliable estimate is assigned to the lowest or root level of the tree. Using the probability estimate for the other signal bits, the signal bit having the next most reliable estimate is assigned to the second level of the tree, and so forth, with the signal bit having the least reliable estimate being assigned to the highest level of the tree adjacent the terminating nodes or leaves of the tree. By building the decoding tree in this manner for each iteration of symbol decoding, a reduced complexity search is more likely to include paths (and nodes) in the tree containing the correct value for the channel symbols.

18 Claims, 3 Drawing Sheets

$$\Omega(b) = \underbrace{\mathrm{Re}(b_1[2y_1 - b_1R_{11}])}_{\substack{1^{st}\text{ TERM}\\ \text{METRICS FOR}\\ \text{MOST RELIABLY}\\ \text{ESTIMATED SYMBOL}}} + \underbrace{\mathrm{Re}(b_2[2y_2 - b_2R_{22} - 2b_1R_{12}]}_{\substack{2^{nd}\text{ TERM}\\ \text{METRICS FOR}\\ 2^{nd}\text{ MOST RELIABLY}\\ \text{ESTIMATED SYMBOL}}} + \underbrace{\mathrm{Re}(b_3[2y_3 - b_3R_{33} - 2(b_1R_{13} + b_2R_{23})])}_{\substack{3^{rd}\text{ TERM}\\ \text{METRICS FOR}\\ 3^{rd}\text{ MOST RELIABLY}\\ \text{ESTIMATED SYMBOL}}} + \cdots$$

FIG. 3

METHOD AND APPARATUS FOR IMPROVED TURBO MULTIUSER DETECTOR

FIELD OF THE INVENTION

This invention relates to the field of communications and more particularly to an improved method and apparatus in a receiver for iterative turbo multi-user detection utilizing tree pruning.

BACKGROUND OF THE INVENTION

The present invention belongs to the art of multiple access communications systems such as, but not limited to, wireless Local Area Networks (Wireless LANS), cellular land-mobile communications systems, mobile satellite communications systems, and memory storage and retrieval devices. Such systems are characterized by at least one fixed base or relay station attempting to maintain communications with a plurality of subscriber stations or terminals that are each assigned a different time slot (TDMA), a different frequency slot (FDMA), or different signature waveform (CDMA), to name a few examples.

In such systems, capacity to support a large number of subscribers is measured in units such as Erlangs per MHz per square kilometer, a sum capacity (e.g. the sum of the information data rates—Bits/sec—of all the users in the system). Of primary interest is the maximum number of users that can operate within the system without having to decrease the information rate that they are already accustomed to using or increase the total bandwidth occupied by the system. The capacity can be increased by using more MHz of bandwidth, by reducing the area covered by each base station so that there are more base stations per square kilometer, by decreasing the frequency spacing between channels, and by transmitting more than one signal in the same frequency channel or time slot. However, reducing cell size or reducing the number of signals received by the detector is not always possible or economically feasible. When such action is possible, it increases the infrastructure cost. In addition, some of the above listed solutions increase inter-symbol interference (ISI) and multi-user interference (MUI), also called co-channel interference, that may be caused by a signal being received along with a delayed version thereof caused by a reflection of the signal from an object such as a large building, or receipt of another, weaker signal having the same frequency and meant to be received at a different receiver. In addition, received signals are typically corrupted by additive Gaussian noise.

In order to be able to further accommodate increased traffic, and to make maximum utilization of a traffic channel, multiple interfering signals may be transmitted on the same communication channel and are purposely allowed to interfere with one another. The effects of the resulting multiuser interference is then removed at the receiver by a multiuser detector (MUD). Using a MUD does not require a change in the existing transmitted signaling method, making it an attractive option.

To separate multiple interfering signals transmitted on the same communication channel some unique apriori knowledge of each of the signals is required. For this purpose a parameter estimation unit is required, such as disclosed in co-pending U.S. patent application Ser. No. 09/943,770, filed Aug. 31, 2001, entitled "System For Parameter Estimation And Tracking Of Interfering Digitally Modulated Signals". The parameter estimation required to attain this apriori knowledge may be done using "blind" parameter estimation, "non-blind" parameter estimation, or parameter estimation with the aid of training sequences. This last method is typically derived using a "training signal" or other knowledge of received signals in a manner well known in the art. The purpose of the parameter estimation unit is to identify and determine parameters associated with each signal that may later be used by the multi-user detector (MUD) to separate each signal from the other interfering signals, regardless of the fact that the signals exist in the same communications bandwidth and at the same instant in time. These parameters might include the received power, the phase of the oscillator which generated each received signal, the timing offset relative to the base station clock, carrier frequency, any frequency offset of the carrier (phase difference), the assigned spreading code, and the structure of multi-path replicas.

To successfully demodulate simultaneously occurring interfering signals, signal processing of the received signals is accomplished utilizing multi-user detection (MUD) techniques. Early work in MUD, described in *Multiuser Detection* by S. Verdu, Cambridge University Press, 1998 proposed using computationally intense maximum likelihood (ML) exhaustive search techniques to separate the interfering signals. In certain applications, linear MUD detectors with lower computational demands may be used, and such MUD detectors are described by Verdu. However, the reduction in performance, particularly in high-interference situations, is so significant as to make those reduced complexity techniques not applicable. One method of implementing a ML is the well-known decoder known as the Viterbi decoder. A Viterbi decoder is based upon the Viterbi algorithm and performs a breadth first decoding search of all paths through an entire code tree (or trellis, which is a more compact representation of the code tree) by extending paths through the tree and the entire tree is searched. The complexity of the maximum likelihood (ML) Viterbi decoder in the context of many applications is prohibitively high.

The M-algorithm is a tree-pruning technique that approximates the operation of a ML Viterbi decoder at reduced complexity. The M-algorithm is a breadth first decoding algorithm, but with the M algorithm only the best M paths are retained at each level in the tree. This reduced tree search, referred to as "tree pruning", reduces the number of calculations that must be made and therefore speeds the overall tree processing. The M-algorithm is described in greater detail further in the specification.

Viterbi algorithm decoders and M algorithm decoders are also well known in the art as maximum likelihood decoders which can be used in systems that employ error correcting codes, such as convolutional codes, tree codes, and a variety of other codes, all of which can be generally characterized by a tree. The basic concept of these decoders can be described as correlating all possible transmitted sequences with the received sequence and then choosing as the "best" or "maximum likelihood" path the sequence whose correlation is a maximum.

A tree consists of a sequence of concatenations of a so-called tree diagram, or state transition diagram. The tree diagram defines, for each code state, which next state or states the encoder is allowed to transition to. The allowable transitions from one state to a next state are limited. Each possible transition from one state to a next state in a tree is called a branch. Each branch, therefore, corresponds to a subset. A sequence of signal points selected from a sequence of interconnected branches is called a path through the tree.

Transmitted signal points are displaced in signal space due to noise and channel-induced distortion, and a receiver may use a Viterbi algorithm decoder or an M algorithm decoder, operating on a received version of the transmitted signal points, to perform the aforementioned maximum likelihood sequence detection or an approximation of ML sequence detection, respectively. Based on the received version of the transmitted signal points and the knowledge of the tree code used by the encoder, the decoder determines the most likely sequence of signal points that was actually transmitted. The decoder performs this function by forming a decision as to what was the most likely transmitted signal point that would have caused the encoder to transition into a next state of the code. The technique works on concepts that can be modeled as a tree code. In the case of interfering signals, a tree can be formed that represents all possible choices of the transmitted values for all signals. That is, error correction coding is not necessarily assumed for tree decoding and doesn't necessarily dictate the formation of the tree. Rather, the tree is formed by the fact that different hypotheses for the received sequences are possible.

More particularly, a Viterbi algorithm decoder, an M algorithm decoder, or any other tree-search decoder forms paths through a tree by keeping track of so-called "metrics". A branch metric, a function of the received version of the signal point, is calculated for each current-to-next-state transition associated with each branch in the tree diagram. Every path through the tree which leads into a state has an associated path metric which is a function of the sum of the branch metrics for the branches that make up that particular path. Further, a path entering a current state may be extended through the tree and enter a next state by including a branch representing an allowed transition from the current state to the next state. The path metric for such an extended path is a function of the sum of (a) the path metric associated with the path as it entered the current state and (b) the branch metric associated with the included branch.

The Viterbi decoder compares the path metrics of the different paths entering a state and retains as one of the aforementioned surviving paths the path with the smallest path metric. All other paths entering that state are discarded. The surviving paths are used by the decoder to make a final decision as to the value of an earlier transmitted signal point.

To reduce the complexity of the tree search, thereby increasing the speed of testing multiple hypotheses, shortcuts may be deliberately taken in the processing with a tree decoder. For instance, the M-algorithm prunes the tree by retaining, at every stage in the tree, the best M paths through the tree at each level in the tree. The computational complexity of a tree search is directly related to the number of hypotheses which must be tested, i.e. the number of paths through the tree which must be examined. For example, for an ML multi-user detector for which there are K interfering signals and which uses the Viterbi algorithm, the computational complexity is on the order of $2^K$ for each symbol interval. For the M-algorithm, the complexity is on the order of $K^{1.2}$ for each symbol interval. The reduction in complexity by using the M-algorithm is considerable, but not for very large values of K or for high data rates. In addition, tree pruning carries with it the risk that the correct path through the tree is eliminated from consideration, which causes a decoding error. Judicious pruning is required. For the M-algorithm, as M is decreased, the complexity is reduced b the probability of incorrect pruning increases. That is, the need for accuracy limits the reduction in complexity that is feasible. The M-algorithm is described in greater detail further in the Summary of the Invention. See also U.S. Pat. No. 6,151,370 issued Nov. 21, 2000 which describes the M-algorithm. Tree pruning techniques also apply to maximum a posteriori (MAP) decoders.

The process used to decode turbo codes, known as the "turbo principal," may be used as an alternative to ML decoding in systems other than turbo coded systems. Because the turbo principal is used in the multi-user detector (referred to as TurboMUD) described in this invention even though it does not employ turbo codes, turbo decoding is now described in the context of turbo codes. However, turbo decoding, or the turbo principal, may be used whenever the system chain up to the receiver contains either serial or parallel concatenated components that mathematically resemble codes. Turbo codes are forward error control codes that are generated using recursive systematic encoders operating on different permutations of the same code information bits to improve the performance of a transmission channel. Turbo decoding involves an iterative algorithm in which probability estimates of the code information bits that are derived by one decoder for the coded information bits being processed in that decoder are fed back to the other decoder as apriori information that can be used in processing by that decoder. Each iteration of decoding of the code information bits through the two decoders generally increases the reliability of the probability estimates. This iterative feedback and decoding process continues, decoding the code information bits a finite number of times, and a decision is made based on the final probability estimates that the bits represent the transmitted data and can be used to make reliable decoding decisions. The turbo decoder operates on one block of coded data bits, or symbols, at a time, passing the revised estimates between the compnent decoders until processing of that block is complete. One complete pass through both component decoders in the turbo decoder by a block of coded bits is referred to as a decoding iteration; a typical number of iterations required for adequate bit error performance is three to eight.

An arrangement for performing a termination checking procedure, preferably performed after each iteration of decoding, is to determine if a minimal absolute probability value associated with any of the bits in the packet has been reached. Such an arrangement is taught in U.S. Pat. No. 6,182,261. When the minimal absolute probability value is above a predetermined threshold, indicating that all of the bits have been assigned either the value "+1" or "0" with relatively high probability, the iterative turbo decoding process is terminated.

More particularly, rather than determining immediately whether received code information bits are either a 0 or +1, the receiver assigns each code information bit a value on a multi-level scale representative of the probability that the bit is +1. A common scale, referred to as log-likelihood ratio (LLR) values, represents each bit by an integer in an implementation-specific specific range, for instance in the range (−32, +31). For this example integer range, the value of +31 signifies that the transmitted bit was a 0 with very high probability, and the value of −32 signifies that the transmitted bit was a one, with very high probability. An LLR value of 0 indicates that the bit value is indeterminate. Stated another way, those bits which have a probability indicating that they are closer to +1 (for example, between 0 and +31 on the scale described above) are tentatively assigned a value of 0, and the rest of the bits (between −32 and 0) are tentatively assigned a value of +1. Furthering the example, an LLR value of +31 means that the transmitted bit value is 0 with a probability of 31/62+0.5=1, and the probability that the transmitted bit value is one is 0.5−31/62=0. An LLR probability of 16 means that the probability of bit value 0 is approximately 0.75 and the probability of bit value +1 is approximately 0.25. When a probability is equal to 0.5, it means that either bit value (0 or +1) is equally likely. The probabilities then, and the corresponding LLR values, indicate the confidence with which the decoder is making the bit decision.

Data represented on the multi-level scale described in the previous paragraph is referred to as "soft data," and the iterative decoding performed is usually soft-in/soft-out, i.e., the decoding process receives a sequence of inputs corresponding to probabilities for the code information bit values and provides as output corrected probabilities taking into account constraints of the code information bits. Generally, a decoder which performs iterative decoding, uses soft data from former iterations to decode the soft data read by the receiver. A method of iterative decoding is described, for example, in U.S. Pat. No. 5,563,897.

The turbo principal as described above is a powerful alternative to ML or MAP decoders. The component decoders contained within the turbo decoder, may employ shortcut techniques that reduce the complexity. The component decoders themselves typically contain ML or MAP tree search algorithms such as Viterbi decoders, M-algorithm decoders, or other tree search algorithms. The decreased incremental performance of each component that comes as a cost of reduced incremental (i.e. per-iteration) complexity is compensated by iterating. The component decoders contained within the turbo-decoder exploit different relationships between the signals, allowing for performance gains as the number of iterations increases. That is, an iterative decoder using the turbo principal produces improved overall performance when compared to a non-iterative reduced complexity tree search algorithm of similar complexity. However, processing the interfering signals multiple times, i.e. iterating, to maintain the performance level as measured by bit error rates mitigates the complexity reduction gains achieved by shortcuts within the component decoders of the turboMUD. A tradeoff of complexity versus performance and complexity versus processing speed remains.

To further improve the performance of a communication system, some coding schemes include interleavers at the transmitter, which mix up the order of the bits in each packet of bits during encoding. Thus, when interference destroys a few adjacent bits during transmission, the effect of the interference is spread out over the entire original packet and can more readily be overcome by the decoding process. Other improvements may include multiple-component codes which include coding the packet more than once in parallel or in series. However, as this invention is concerned with operation at the receiver, the interleavers included in the receiver are only the interleavers and de-interleavers that are necessary to reverse the operation of any interleaving done at the transmitter.

In short, despite all the decoding processing gains in the art there is still a need for an improved method and apparatus for signal processing simultaneously occurring, interfering signals to speed the decoding processing and allow for acceptable detection performance at real-time operational speeds.

SUMMARY OF THE INVENTION

The present invention provides an improved method and apparatus for processing simultaneously occurring, interfering signals using a turboMUD detector that contains component tree decoders by improving tree construction and the tree pruning to reduce signal processing time to a minimum.

When a decoding tree is constructed in a multi-user decoder at the signal receiver, one level of the tree is defined for each of the co-channel, interfering signals, as is known in the prior art. In accordance with the teaching of the present invention a new decoding tree is constructed for each iterative processing step of the code information bits by the decoder, and when the decoding trees are constructed the individual signal having the lowest "probability estimate" of all the interfering, received signals, as calculated by single user decoders, is assigned to the lowest or root level of the decoding tree, and the other signals are assigned to the other levels in the tree in a descending order based on their probability estimates. As described in the Background of the Invention, prior art probability estimates represent each bit by an integer in a specific range, such as the previous example using the range (−32, +31). In the embodiment of the invention described herein the probability estimates range between 0 and +1 where for a probability estimate value of 0.5 the value of a transmitted symbol is equally likely to have a value of +1 or −1. For a probability estimate between 0 and 0.5 it is more likely that the value of a symbol has a value of +1, and for a probability estimate between 0.5 and 1.0 it is more likely that the value of a symbol has a value of −1. Stated another way, those bits which have a probability estimate indicating that they have a value that is closer to one (for example, between 0 and 0.5 on the scale described above) are assigned a value of plus one, and the remainder of the bits (between 0.5 and 1.0 on the scale described above) are assigned a value of minus one. As previously stated, the probabilities, and the corresponding log-likelihood ratio (LLR) values, indicate the confidence with which the decoder is making the symbol decision. Note that a probability estimate value near 0 implies a high decoding confidence in the same way that a probability estimate value near +1 implies a high decoding confidence, since the sum of probability of the transmitted symbol being a −1 and the probability of the transmitted symbol being a +1 is equal to the probability value of 1.

In accordance with the teaching of the present invention, for each iteration of turbo decoding the one of the signals being decoded by the MUD (multi-user decoder) detector within the turboMUD having a tentatively decoded symbol whose confidence value (probability estimate), as calculated by the single user decoders, is highest (i.e. closest to either +1 or 0) is assigned to the lowest or root level of the decoding tree. The signal whose tentatively decoded symbol has the next highest confidence value is assigned to the second level of the tree, and so forth, until the signal symbol having the least reliable estimate, i.e. the lowest confidence value, is assigned to the highest level of the tree adjacent the terminating nodes or leaves of the tree. This allows the MUD detector to operate on the most reliable symbols first, improving the likelihood that the pruning within the MUD detector is correct.

DESCRIPTION OF THE DRAWING

The invention will be better understood upon reading the following Detailed Description in conjunction with the drawing in which:

FIG. 3 shows an equation representing the M-algorithm.

DETAILED DESCRIPTION

Figure 1:
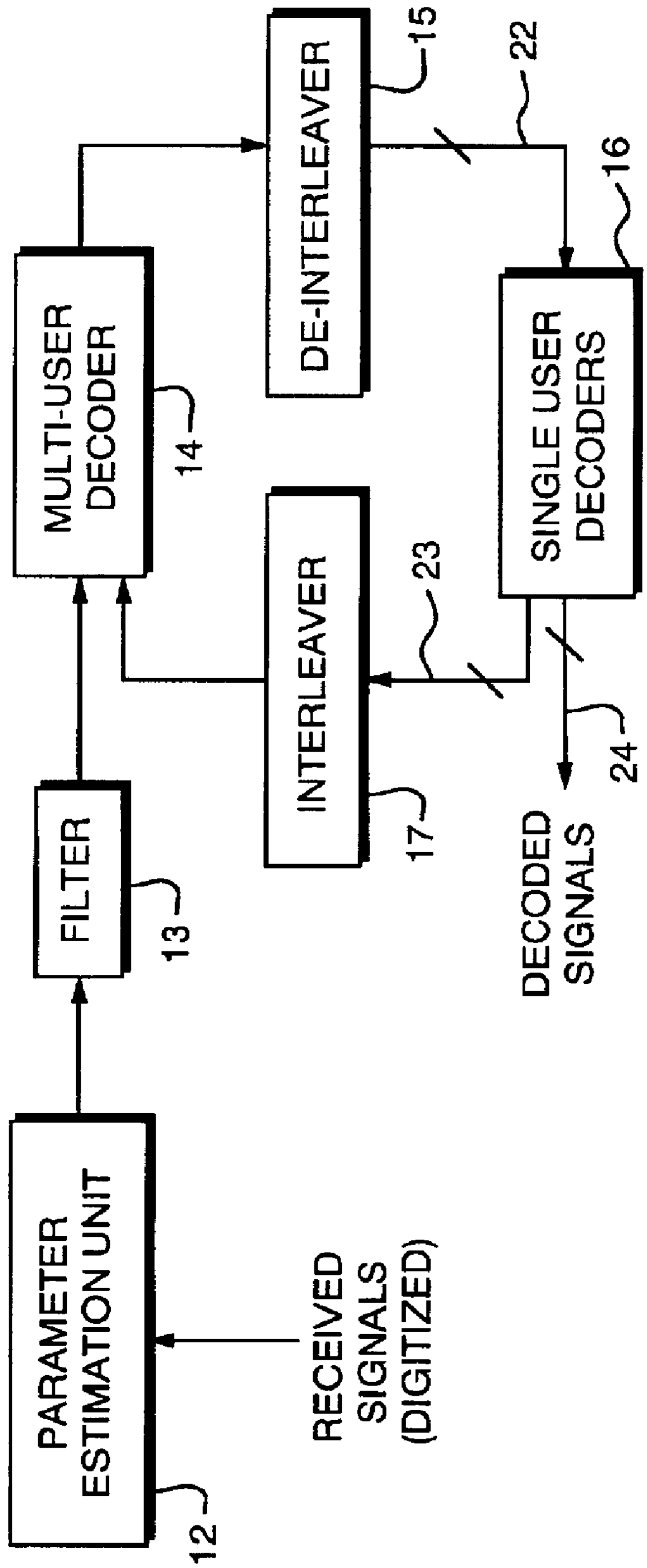
FIG. 1 is a simplified block diagram of a portion of a prior art receiver circuitry utilizing iterative turbo decoding to separate multiple interfering signals on the same communication channel.

In FIG. 1 is shown a simplified block diagram of a portion of a prior art receiver circuitry utilizing iterative turbo decoding to separate multiple interfering signals on the same communication channel. It shows an implementation of a prior art turbo multi-user detector (turboMUD) used to incorporate turbo decoding techniques into MUD with forward error correction (FEC) decoding.

The operation of this prior art, turbo multi-user detector (turboMUD) assumes knowledge of various parameters about received signals such as relative received timing offsets, carrier phase, frequency offsets, received amplitudes, and multi-path structure for each of the interfering signals present in the received signal. A parameter estimation unit 12 is therefore needed. In a turboMUD system decoding, probability estimate and channel symbol estimate information is repeatedly passed between a multi-user decoder (MUD) 14 and a plurality of single-user decoders 16. Soft output decoders, such as maximum a posteriori (MAP) decoders, or approximations of MAP decoders, or soft output Viterbi algorithm (SOVA) decoders, are used for both the MUD 14 and single user decoders 16 so that soft output information is available as is known in the prior art. The MUD 14 unit uses relationships between interfering signals to correct errors within a block of received data due to multi-user interference. The plurality of single user decoders 16 uses the coding relation imposed on each user at the transmitter by an error correction encoder to exploit relations within the sequence of symbols transmitted by each individual user to correct for received symbol errors. Together, MUD 14 and the single user decoders 16 work in concert to estimate the transmitted sequence of symbols from all users within a time frame, also called a block, that is under consideration.

A digitized signal passes through conventional receiver circuitry (not shown) and is then input to parameter estimation unit 12 which utilizes unique apriori knowledge of each of the received signals to help identify parameters for each interfering signal, regardless of the fact that the signals exist in the same communications bandwidth and at the same instant in time. These parameters includes the received power, the phase of the oscillator which generated each received signal, the timing offset relative to the base station clock, carrier frequency, any frequency offset of the carrier (phase difference), and the structure of multi-path replicas. This knowledge is typically derived using a parameter estimator in a manner well known in the art, such as the training signal method disclosed in the above identified patent application entitled "System For Parameter Estimation And Tracking Of Interfering Digitally Modulated Signals". However, it is not assumed that training sequences are employed for the MUD receiver to operate correctly.

The digitized signal is then passed through a whitening matched filter 13, of a type known in the art, which serves to cancel some inter-symbol (ISI) interference or which reduces the correlation between symbols of interfering users. An example of such a whitening matched filter is described in detail in U.S. Pat. No. 6,167,022.

The whitened signal is input to multi-user decoder (MUD) 14. In the optimal case, MUD 14 is a full-complexity MAP detector. Suboptimal reduced complexity MAP approaches for MUD detector 14 may be used in an effort to achieve real-time performance. MUD 14 is preferably any tree-based decoder, such as an M-algorithm based tree decoder of a type described in the Background of the Invention. The output from MUD 14 are typically soft signal symbol estimates called "channel symbol estimates" in this description.

If the received signals had been interleaved at the transmitter, the signals output from MUD 14 are first passed through a de-interleaver 15 and passed on in a shuffled, de-interleaved form over lines 22 to a bank of single user decoders 16 in a manner well known on the art. Although interleaving and de-interleaving are mentioned with reference to FIG. 1 for completeness, they are not mentioned with reference to FIG. 2 since they are well known in the art.

After being re-ordered by de-interleaver unit 15 the symbol estimates output from MUD 14 are input to each of a plurality of single-user decoders 16, with there being one single-user decoder used for each signal to be decoded, that decodes all symbols/bits in a particular signal. The single user decoders 16 calculate conditional probabilities called "probability estimates" in this specification, one for each decoded symbol of each user, and output them as probability estimates on line 23.

The single user decoders 16 are soft-output decoders, such as MAP decoders, soft-output Viterbi algorithm (SOVA) decoders, or soft-output M-algorithm-based decoders, which are all well-known in the art. There is a "probability estimate" associated with each data bit in each signal.

Since there is only a single user associated with each of decoders 16 it is feasible to use a full-complexity MAP decoder, SOVA decoder, or other soft-output decoder for each single user decoder 16 to look at all hypotheses in the tree, not just the most likely hypotheses. The single-user decoders 16 each calculate "probability estimates" from their respective signals and output them for use by MUD 14 which uses them as apriori information during the next iteration of MAP decoding by MUD 14.

Interleaving of the signals output from single user decoders 16 on leads 23 is performed at interleaver 17 to restore the received signals to their original received order. The probability estimates calculated by decoders 16 for each signal are therefore passed in interleaved form to and used by MUD 14 as apriori information when processing the signal a second and subsequent time in the iterative turbo processing.

The passing of information between MUD 14 and the single-user decoders 16 is repeated a predefined number of times, until the desired bit error rate performance is attained, or until further iterations result in insignificant changes in the channel symbol estimates. At that point, the estimates of the decoded signals (i.e. estimates of the data sequences) are output from the single user decoders 16 over path 28.

The operation then commences using the next block of received data bits, repeating the process described above. The above described operation is possible in real time only if the processing for the computations done for all of the iterations for each block of data sequences is completed before the next data symbol sequences are received. In general, for a large number of interfering users, real time processing with acceptable bit error rate performance is not possible for the prior art system just described.

Figure 2:
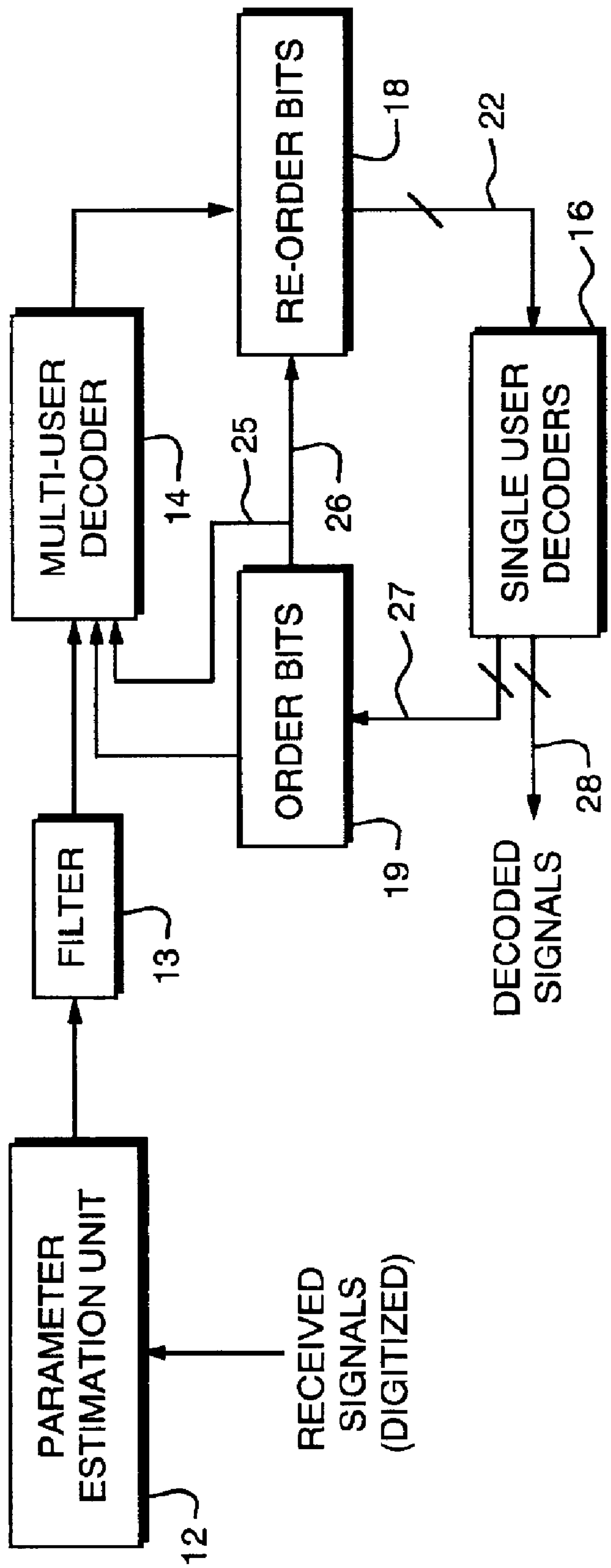
FIG. 2 is a simplified block diagram that features the teaching of the invention by showing a portion of a prior art receiver circuitry implementing turbo decoding with the addition of probability estimate ordering in the levels of the tree for each decoding iteration in accordance with the teaching of the invention.

FIG. 2 shows a simplified block diagram that shows a block diagram of a portion of a prior art receiver circuitry implementing turbo decoding with the addition of re-ordering of the signals assigned to each levels of the tree of MUD decoder 14 for each decoding iteration based on the value of the probability estimates output from the single user decoders 16 on the previous decoding iteration in accordance with the teaching of the invention. It can be seen that FIG. 2 is somewhat similar to FIG. 1 except for blocks 18 and 19 and paths 25 and 26 which are used to implement the present invention. As previously stated, if interleaving was applied to the data sequences at the transmitters, de-interleaving and interleaving units would be added to the block diagram in FIG. 2. For simplicity, FIG. 2 considers the case for which interleaving is not present at the transmitters. It is important to note that ordering unit 19 and reordering unit 18 in FIG. 2 are not replacements for interleaver 17 and de-interleaver 15. Rather, they are used to implement the invention in addition to any interleaving/de-interleaving necessitated by the format of the transmitted signal sequences.

In FIG. 2 the purpose and operation of parameter estimation unit 12 and whitening filter 13 are the same as described with reference to FIG. 1 so their purpose and operation are not repeated here.

The whitened, digitized signal output from filter 13 is input to a multi-user detector (MUD) 14. In the optimal case, the MUD detector is a full-complexity MAP detector. Suboptimal reduced complexity MAP or ML approaches for MUD detector 14 may be used, only if necessary, in an effort to achieve real-time performance. MUD 14 is preferably any tree decoder such as the M-algorithm tree decoder of a type as described in the Background of the Invention.

The output from multi-user decoder (MUD) 14 are typically soft estimates of the signal symbols called "channel symbol estimates" in this description and are described in greater detail elsewhere in this specification. When the estimates are soft, they are also known as reliability measures, confidence measures and by other names, but "channel symbol estimates" is the designation used in this specification. It is feasible to calculate hard estimates with reduced computational complexity, at a degraded performance level. However, in this description, it will be assumed that soft estimates are calculated.

The novel difference in MUD 14 in FIG. 2 from the prior art is that the decoding tree that is constructed therein can be, and usually is, operating on symbols from users in an order determined in order bits unit 19 using the value of the probability estimates determined by the single user decoders 16 during the previous decoding iteration, and that ordering is modified for every iteration of the turbo decoding. In accordance with the teaching of the present invention a newly ordered decoding tree, ordered by order bits unit 19, is constructed in MUD 14 for each iterative processing of the code information symbols through MUD 14.

To accomplish this, order bits unit 19 and re-order bits unit 18 are new. Unit 19 is used to control how MUD 14 constructs its decoding tree for each iteration of symbol decoding, and re-order bits unit 18 receives the ordering information from unit 19 via path 26 and restores the ordering of the processed signal symbols to their original positions following each iteration of processing through MUD 14. The restoration of order is necessary so that the single user decoders receive information in the order imposed by the forward error correction encoder in the transmitters.

The output from single user decoders 16 must be soft estimates of the signal symbols called "probability estimates" in this description and are described in greater detail in the Background of the Invention. They are also known as reliability measures, confidence measures and by other names, but probability estimate is the designation used in this specification.

When the M-algorithm based decoding tree is initially constructed in MUD 14 one level of the tree is defined for each of the co-channel, interfering, multiple signals in a manner well known in the art. Initially, i.e. in the first decoding iteration, because the single user decoders 16 have not calculated probability estimates yet, individual symbols of the interfering signals are assigned an initial probability estimate of 0.5 and are arbitrarily assigned to the levels in the decoding tree.

At the completion of the first time processing of the signals through single user decoders 16 the individual signal bits then have probability estimates ranging between 0 and 1.0. Order bits unit 19 orders the signals so that the signal having a tentatively decoded symbol whose confidence value is highest (i.e. closest either to the value of 1 or 0) is assigned to the lowest or root level of the decoding tree. The signal whose tentatively decoded symbol has the next highest confidence value (i.e. next closest either to the value of 1 or 0) is assigned to the second level of the tree, and so forth, until the signal symbol having the least reliable estimate, i.e. the lowest confidence value, furthest from the value of 0 or 1, is assigned to the highest level of the tree adjacent the terminating nodes or leaves of the tree. This ordering is sent over path 25 to MUD 14. Responsive thereto, in the next iteration of decoding MUD 14 re-constructs its decoding tree so that the signal having the highest confidence value is assigned to the lowest or root level of the decoding tree, the signal having the next highest confidence value is assigned to the second level of the decoding tree, and so on.

At the completion of the first iteration of decoding processing through MUD 14 the signals are passed through re-order bits unit 18. Unit 18 normally receives an indication over path 26 from order bits unit 19 indicating how unit 19 has ordered the signal bits using the probability estimates from single user decoders 16. On the first processing pass through MUD 14 a set of signal bits have not yet passed through single user decoders 16 and order bits unit 19 so the bits are still in their original order. Accordingly, there is no order information on lead 26, re-order bits unit 18 does not change the order of the signal bits, and passes them on to single user decoders 16 in their original order.

At completion of the second and each following iteration of decoding processing by MUD 14 the signals are again passed through re-order bits unit 18. At these times a soft estimate of the each symbol, i.e. probability estimates, has been calculated during a previous decoding by single user decoders 16. Accordingly, there is ordering information on path 26 to re-order bits unit 18 and it responds thereto to re-order the symbols output from MUD 14 to their original order so that the signals can be passed on to single user decoders 16 in their original order and be accurately decoded.

After being re-ordered by unit 18 the channel symbol estimates of information signal symbols calculated by MUD 14 are input to each of a plurality of single-user decoders 16, with their being one single-user decoder 16 used for each signal to be decoded, and each decoder 16 decodes all symbols in a particular signal for the time frame corresponding to the received sequence under observation. The single user decoders 16 calculate conditional probabilities called "probabilities estimates" in this specification, one for each decoded symbol of each user, and outputs them as probability estimates on line 27.

The single user decoders 16 are soft-output decoders, such as MAP decoders, soft-output Viterbi algorithm (SOVA) decoders, or soft-output M-algorithm-based decoders, which are all well-known in the art. There is a probability estimate associated with each symbol of each user.

Since there is only a single user associated with each of decoders 16 it is feasible to use a full-complexity MAP decoder, SOVA decoder, or other soft-output decoder in each single user decoder contained in unit 16 to look at all hypotheses in the tree, not just the most likely hypotheses. The single-user decoders 16 each calculate a probability estimate for their respective signal and outputs it for use by MUD 14 as apriori information during the next iteration of MAP decoding by MUD 14.

The passing of information between MUD 14 and the single-user decoders 16 is repeated a predefined number of times, or until the desired bit error rate performance is attained, or until further iterations will result in insignificant changes in the probability estimates output from single user decoders 16 and therefore will not significantly improve the turboMUD bit error rate performance. At that point, the estimates of the decoded signals (i.e. estimates of the data sequences) are output from the single user decoders 16 over path 28. The above described operation is then repeated for the next block of received data bits.

The process of differently ordering the decoding tree in MUD 14 allows the pruning done in the tree decoder within MUD 14 to be done more correctly, or with fewer hypotheses examined, which reduces the overall complexity of the turboMUD detector and allows for real-time operation.

In FIG. 3 is shown the mathematical expression of an M-algorithm. As may be seen therein, the first-term in the algorithm represents the received signal having the lowest probability estimate (closest to "0") in MUD 14, as determined by the single user decoders 16 and order bits unit 19; the second term in the algorithm represents the received signal having the next lowest probability estimate; the third term in the algorithm represents the received signal having the third lowest probability estimate; and so forth.

Omega represents the real-valued metric value calculated for a complete path through a tree using the equation; $b_1$, $b_2$ etc. are the binary values of a transmitted data symbols of each individual signal in the co-channel, interfering signals and are either a +1 or −1, and both values (+1 and −1) are tried in the equation in each symbol hypothesis to determine the lowest metric value; $R_{11}$, $R_{12}$ etc., are entries in the correlation matrix formed by the signature vectors of all the interfering users over the time frame associated with the data sequences of interest; and $y_1$, $y_2$ etc. are vector space representations of the outputs of the whitening matched filter for all received interfering signals. Each term on the right-hand side of the equation represents a node of the decoding tree and all of the possible hypotheses branching from that node.

As previously described, prior art decoders calculate the metrics of many complete paths through a tree between the tree root and each terminating node or leaf of the tree. The path through a tree having the "best" metric value defines the nodes and thereby the value of the "b" terms (+1 or −1) for each individual signal bit comprising the co-channel, interfering signal. Depending on the mathematical representation used for the metric in the tree construction, the path with either the largest or the smallest metric is chosen as the most likely path. The choice of relying on the smallest metric or largest metric is based on which choice produces the highest probability of being correct. The variations associated with these implementation details are well known in the art. While the use of tree pruning algorithms reduces the computational complexity required to determine a "best" path through the decoding tree, their complexity improvement is limited due to bit error rate performance constraints. That is, pruning can eliminate the correct path from considering within the decoder, causing a decoding error and degrading the overall performance while speeding the processing speed. The tradeoff between processing speed and overall bit error performance is a delicate one that prior art has not resolved to the point of allowing for real time processing for a large number of interfering signals at reasonable bit error rates.

In accordance with the teaching of the invention, the order in which hypotheses are examined is changed so that the terms of the M-algorithm are arranged in decreasing levels of confidence. In this way, the number of paths examined in the decoding tree of MUD 14 from root to leaf is reduced without increasing the likelihood of improperly pruning the true best path through the decoder. Thus, the decoding process is greatly speeded up without affecting overall error performance.

To accomplish this, the most reliable estimate (i.e. the estimate with probability estimate closest to the value of either 0 or +1) obtained by any one of the single user decoders 16 is inserted into the first term of the M-algorithm equation shown in FIG. 3. The first term of the M-algorithm along with the two possible values of "$b_1$" (+1 and −1) for that symbol are calculated and saved. Two metric values are calculated, the value of "$b_1$ "(+1 or −1) yielding some number "M" of the best metric values are retained. The process progresses from the first term to the second term of the equation.

The next most reliable estimate, i.e. the probability estimate second closest to the value of 0 or +1, obtained by a single user decoder 16 is inserted into the second term of the M-algorithm along with ones of the previously saved surviving estimates of $b_1$ from the first term of the algorithm and other information from the whitening matched filter 13 and parameter estimation unit 12. Metric values are again calculated, the paths and values of $b_2$ (+1 or −1) combined with the surviving possible estimates for $b_1$ to yield some number "M" of the best metric values that are again retained.

The process progresses from the second term to the third term of the equation and all subsequent terms of the equation until the pruned tree has been examined to the stage containing the leafs. This process results in pruning the tree very efficiently, with both speed and accuracy.

By building the tree with each signal bit having the most reliable probability estimate being assigned to the lowest level of the tree and so on, a reduced search using the M-algorithm based MUD 14 is more likely to include paths (and nodes) that contain the correct answer. In other words, due to the novel probability estimate ordering in the decoding tree, a low complexity suboptimal search of the tree will be less likely to chop off branches containing the correct answer, thus supplying the correct decoding answer more often than when probability estimate ordering is not used.

While what has been described herein is the preferred embodiment of the invention it should be obvious to those skilled in the art that the teaching of the present invention may be applied to any field in which tree decoding is utilized, and the invention may be modified without departing from the spirit and scope of the invention.

What is claimed is:

1. A method for decoding individual blocks of data of a sequence of received interfering signals corrupted by multiuser interference by performing multiple iterations of decoding on the signals to identify the value of signal points for decoding the signals, the method uses a multi-user decoder and a plurality of single user decoders, the multi-user decoder using an algorithm defining a tree diagram having a number of node levels equal to the number of signals from which the signal points are derived, with the first/highest order term of the algorithm being assigned to the first/root node level of the tree, the second/next highest term of the algorithm being assigned to the second node level of the tree, to the last/lowest order term of the algorithm being assigned to the last node level of the tree, and the method for decoding the signals in each block of data comprising the steps of:

(a) performing a first decoding of the received interfering signals in a block of data in the multi-user decoder to determine first channel symbol estimates for each of the signals;

(b) performing a first decoding of the signals in the block of data in the single user decoders, with each signal being assigned to and processed by a respective one of the single user decoders, and using the first channel symbol estimates determined in step (a) for each signal assigned to a respective one of the single user decoders to determine a first probability estimate for each of the data bits in the signals, the decoding in steps (a) and (b) accomplishing a first iteration of decoding;

(c) performing a subsequent decoding of the received interfering signals in a subsequent block of data in the multi-user decoder initially using the first probability estimates determined in step (b) for each of the signals, after assigning the signal that has a probability estimate closest to a predetermined value to the first term of the algorithm, assigning the signal that has a probability estimate next closest to the predetermined value to the second term of the algorithm, to assigning the signal that has a probability estimate furthest from the predetermined value to the last term of the algorithm, to determine a revised channel symbol estimate for each of the channel symbols;

(d) performing a subsequent decoding of the signals in the subsequent block of data in the single user decoders, with each signal being assigned to and processed by a respective one of the single user decoders, and using the revised channel symbol estimates determined in step (c) for each signal assigned to a respective one of the single user decoders to determine a revised probability estimate of the data bits for each of the signals, the decoding in steps (c) and (d) accomplishing a second iteration of decoding;

(e) repeating steps (c) and (d) for third and subsequent iterations of decoding, with channel symbol estimates for each iteration of decoding determined in step (c) being used by the single user decoders in step (d), and revised data bit probability estimates for each iteration of decoding determined in step (d) being used is step (c); and (f) decoding the signals in the block of data using the value of signal points determined as a result of the iterative decoding steps (a)–(e), wherein the iterative decoding steps (a)–(e) using different probability estimates determined during each iteration of decoding improves tree construction and tree pruning to reduce signal processing time to a minimum.

2. The method in accordance with claim 1 wherein the iterative decoding by the multi-user and single user decoders is repeated until there are insignificant changes in the probability estimates for each signal processed by the single-user decoders.

3. The method in accordance with claim 1 wherein the iterative decoding by the multi-user and single user decoders is repeated a predetermined number of times before the signals are decoded.

4. The method in accordance with claim 1 further comprising the step of re-ordering the bits output from the multi-user decoder to match the original order of the received interfering signal bits.

5. The method in accordance with claim 4 further comprising the step of ordering the signal bits output from the single-user decoders before they are re-input to the multi-user decoder, into an order wherein the bit values associated with the signal whose revised probability estimate output from the single user decoders is closest to the predetermined values 0 or +1 are first processed by the highest order term of the algorithm used by the multi-user decoder, wherein the bit values associated with the signal whose revised probability estimate output from the single user decoders is next closest to the predetermined values of 0 or +1 are processed by the second highest order term of the algorithm used by the multi-user decoder, to wherein the bit values associated with the signal whose revised probability estimate output from the single user decoders is furthest from the predetermined values of 0 or +1 are processed by the lowest order term of the algorithm, to determine new channel symbol estimates for each of the signals.

6. The method in accordance with claim 5 wherein the iterative decoding by the multi-user and single user decoders on each block of data is repeated until there are insignificant changes in the data bit probability estimates for each signal obtained by the single-user decoders.

7. The method in accordance with claim 5 wherein the iterative decoding by the multi-user and single user decoders on each block of data is repeated a predetermined number of times before the signals are decoded.

8. An apparatus for decoding individual blocks of data of a sequence of received interfering signals corrupted by multi-user interference by performing multiple iterations of decoding on the signals to identify the value of signal points for decoding the signals, the decoding being based on an algorithm defining a tree diagram having a number of node levels equal to the number of signals from which the signal points are derived, with the first/highest order term of the algorithm being assigned to the first/root node level of the tree, the second/next highest term of the algorithm being assigned to second node level of the tree, to the last/lowest order term of the algorithm being assigned to the last node level of the tree, the apparatus comprising:

a multi-user decoder for performing a first decoding of the received interfering signals to determine a first estimate for each channel symbol contained in each of the signals; and a plurality of single user decoders each performing a first decoding on one of the signals using the first channel symbol estimate for each signal to determine a first data bit probability estimate for each signal;

wherein said multi-user decoder performs a second decoding of the signals using the first probability estimates to determine a revised set of channel symbol estimates for the signals;

wherein said plurality of single user decoders each perform a second decoding on one of the signals using the revised channel symbol estimates determined by the multi-user decoder for each signal to determine second probability estimate for each data bit in each signal;

wherein iterative decoding is repeatedly performed by the multi-user decoder and single user decoders with the revised probability estimates from the single user decoders being used to assign the signal that has a probability estimate being closest to a predetermined value to the first term of the algorithm, assigning the signal that has a probability estimate being next closest to the predetermined value to the second term of the algorithm, to assigning the signal that has a probability estimate furthest from the predetermined value to the last term of the algorithm, to determine a subsequent channel symbol estimate for each of the signals; and wherein the signals are decoded using the value of signal points determined as a result of the iterative decoding performed by the multi-user and single user decoders, wherein the iterative decoding using the different probability estimates determined during each iteration of decoding improves tree construction and tree pruning to reduce signal processing time to a minimum.

9. The invention in accordance with claim 8 wherein the iterative decoding by the multi-user and single user decoders on each block of data is repeated until there are insignificant changes in the data bit probability estimates for each signal processed by the single-user decoders.

10. The invention in accordance with claim 8 wherein the iterative decoding by the multi-user and single user decoders on each block of data is repeated a predetermined number of times before the signals are decoded.

11. The invention in accordance with claim 8 further comprising means for re-ordering the bits output from the multi-user decoder to match the original order of the received interfering signal bits.

12. The invention in accordance with claim 11 further comprising means for ordering the signal bits output from the single-user decoders before they are re-input to the multi-user decoder, into an order wherein the bit values associated with the signal whose probability estimate output from the single user decoders is closest to the predetermined values of 0 or +1 are first processed by the highest order term of the algorithm used by the multi-user decoder, wherein the bit values associated with the signal whose probability estimate output from the single user decoders is next closest to the predetermined values of 0 or 1are processed by the second highest order term of the algorithm used by the multi-user decoder, to wherein the bit values associated with the signal whose probability estimate output from the single user decoders is furthest from the predetermined values of 0 or +1 are processed by the lowest order term of the algorithm used by the multi-user decoder, to determine a revised channel symbol estimate for each of the signals processed by the multi-user decoder.

13. The invention in accordance with claim 12 wherein the iterative decoding by the multi-user and single user decoders on each block of data is repeated until there are insignificant changes in the data bit probability estimates for each signal processed by the single-user decoders.

14. The invention in accordance with claim 12 wherein the iterative decoding by the multi-user and single user decoders on each block of data is repeated a predetermined number of times before the signals are decoded.

15. A computer readable medium containing executable program instructions for decoding individual blocks of data of a sequence of received interfering signals corrupted by multi-user interference by performing multiple iterations of decoding on the signals to identify the value of signal points for decoding the signals, the decoding uses a multi-user decoder and a plurality of single user decoders, the multi-user decoder using an algorithm defining a tree diagram having a number of node levels equal to the number of signals from which the signal points are derived, with the first/highest order term of the algorithm being assigned to the first/root node level of the tree, the second/next highest term of the algorithm being assigned to second node level of the tree, to the last/lowest order term of the algorithm being assigned to the last node level of the tree, and the executable program instructions for decoding each block of data comprising instructions for:

(a) performing a first decoding of the received interfering signals in a block of data in the multi-user decoder to determine a first channel symbol estimate for each of the signals;

(b) performing a first decoding of the signals in the block of data in the single user decoders, with each signal being assigned to and processed by a respective one of the single user decoders, and using the first channel symbol estimate determined in step (a) for each signal assigned to a respective one of the single user decoders to determine a first data bit probability estimate for each of the signals, the decoding in steps (a) and (b) accomplishing a first iteration of decoding;

(c) performing a second decoding of the received interfering signals in the block of data in the multi-user decoder using the first probability estimate determined in step (b) for each of the signals, after assigning the signal that has a probability estimate closest to a predetermined value to the first term of the algorithm, assigning the signal that has a probability estimate next closest to the predetermined value to the second term of the algorithm, to assigning the signal that has a probability estimate furthest from the predetermined value to the last term of the algorithm, to determine a second channel symbol estimate for each bit in the signals;

(d) performing a second decoding of the signals in the block of data in the single user decoders, with each signal being assigned to and processed by a respective one of the single user decoders, and using the second channel symbol estimate determined in step (c) for each data bit assigned to a respective one of the single user decoders to determine a second data bit probability estimate for each of the data bits in the signals, the decoding in steps (c) and (b) accomplishing a second iteration of decoding;

(e) repeating steps (c) and (d) for third and subsequent iterations of decoding, with revised channel symbol estimates for each iteration of decoding determined in step (c) being used in step (d), and revised data bit probability estimates for each iteration of decoding determined in step (d) being used is step (c); and (f) decoding the signals in the blocks of data using the value of signal points determined as a result of the iterative decoding steps (a)–(e), wherein the iterative decoding steps (a)–(e) using the different probability estimates determined during each iteration of decoding improves tree construction and tree pruning to reduce signal processing time to a minimum.

16. The computer readable medium in accordance with claim 15 further comprising program instructions for:

re-ordering the bits output from the multi-user decoder to match the original order of the received interfering signal bits; and ordering the signal bits output from the single-user decoders before they are re-input to the multi-user decoder, into an order wherein the bit values associated with the signal whose revised probability estimate output from the single user decoders is closest to the predetermined values of 0 or +1 are first processed by the highest order term of the algorithm used by the multi-user decoder, wherein the bit values associated with the signal whose revised probability estimate output from the single user decoders is next closest to the predetermined values of 0 or +1 are processed by the second highest order term of the algorithm used by the multi-user decoder, to wherein the bit values associated with the signal whose revised probability estimate output from the single user decoders is furthest from the predetermined values of 0 or +1 are processed by the lowest order term of the algorithm used by the multi-user decoder, to determine revised channel symbol estimates for each of the signals in the multi-user decoder.

17. The computer readable medium in accordance with claim 16 wherein the iterative decoding by the multi-user and single user decoders on each block of data is repeated until there are insignificant changes in the data bit probability estimates for each signal processed by the single-user decoders.

18. The computer readable medium in accordance with claim 16 wherein the iterative decoding by the multi-user and single user decoders on each block of data is repeated a predetermined number of times before the signals are decoded.

* * * * *